Jan. 30, 1940.  W. BOEKER  2,188,804
CONTROL SYSTEM
Filed Jan. 13, 1939
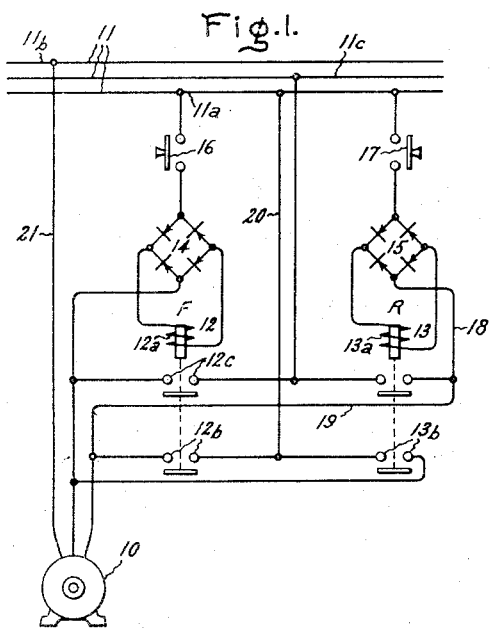
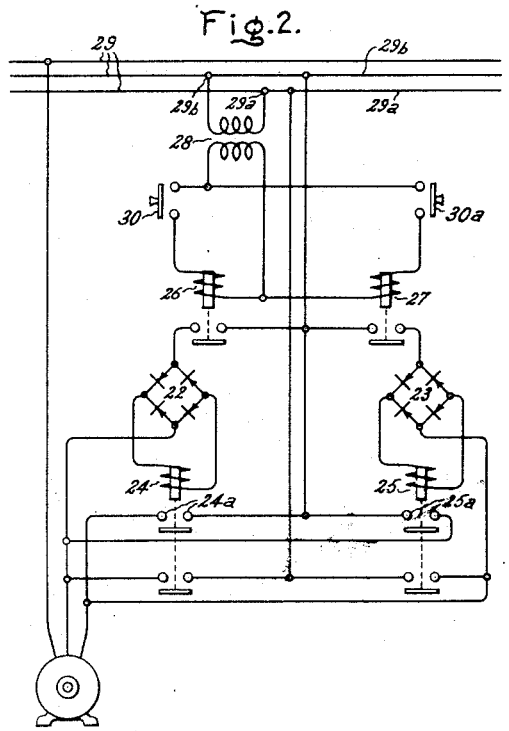
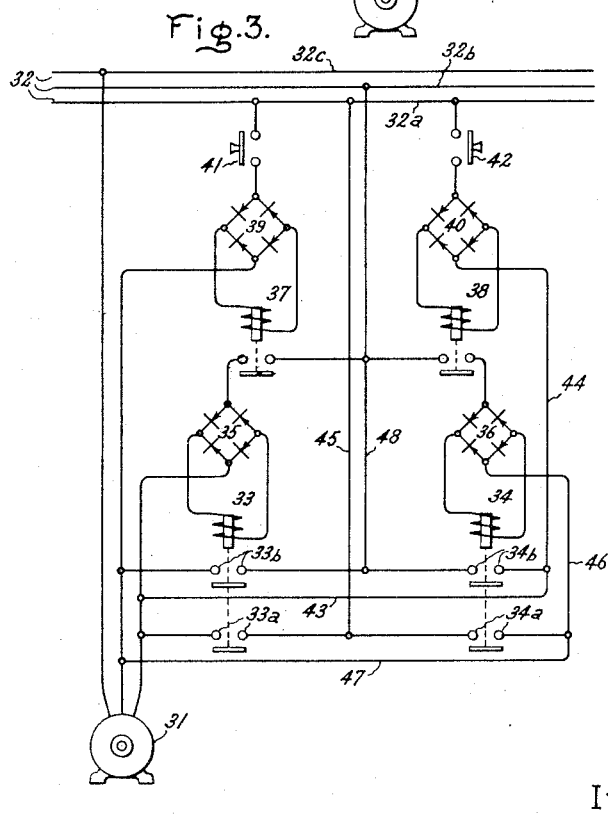
Inventor:
Walter Boeker,
by Harry E. Dunham
His Attorney.

Patented Jan. 30, 1940

2,188,804

UNITED STATES PATENT OFFICE 2,188,804

CONTROL SYSTEM

Walter Boeker, Berlin-Grunewald, Germany, assignor to General Electric Company, a corporation of New York Application January 13, 1939, Serial No. 250,818
In Germany January 13, 1938

4 Claims. (Cl. 172—179)

This invention relates to control systems, more particularly to systems for controlling the operation of electric motors, and it has for an object the provision of a simple, reliable, and improved control system of this character.

More specifically, the invention relates to systems for controlling the starting and reversing of alternating-current motors, and an object of the invention is the provision of a control system in which the operating coils of the reversing switching devices employed are supplied with direct current and the energizing circuits are so interlocked with the switching devices as to eliminate the possibility of phase short circuiting by preventing the closing of the switching device for one direction while an arc is hanging on the contact of the switching device for the reverse direction of rotation.

In carrying the invention into effect in one form thereof, a pair of switching devices is provided for effecting the connection of an alternating-current motor to a polyphase power source. Separate rectifiers are provided for supplying direct current to the operating coils of these switching devices. Means are provided for connecting one alternating-current terminal of each rectifier to one phase of the polyphase source and for connecting the other alternating-current terminal of each rectifier to the motor terminal which has the same voltage when the switching device for the reverse direction of rotation is actuated.

For a better and more complete understanding of the invention, reference should now be had to the following specification and to the accompanying drawing of which Fig. 1 is a simple, diagrammatical illustration of an embodiment of the invention, and Figs. 2 and 3 are modifications.

Referring now to the drawing, an alternating-current motor 10 such, for example, as a squirrel-cage motor or a wound-rotor induction motor, is supplied from a suitable polyphase source of power represented by the three supply lines 11. Suitable electroresponsive means are provided for effecting connection of the motor 10 to the source 11 for rotation in either direction. These means are illustrated as a switching device 12 for connecting motor 10 to the source 11 for rotation in the forward direction, and a switching device 13 for connecting motor 10 to the source 11 for rotation in the reverse direction. The operating coil 12a of switching device 12 is supplied with direct current from a full-wave rectifier 14, and similarly, the operating coil 13a of switching device 13 is supplied with direct current from a full-wave rectifier 15.

Rectifiers 14 and 15 each comprise four rectifying elements connected to form a bridge. Although the rectifying elements may be of any suitable type, they are preferably surface contact type rectifying elements such, for example, as the well-known copper oxide rectifier.

One alternating current terminal of rectifier 14 is arranged to be connected to the lower phase 11a of the supply source 11 when the switching device 16 is closed, and the other alternating-current terminal of this rectifier is connected to that terminal of the motor 10 which has the same voltage when the reverse switching device 13 is closed. In other words, the other alternating-current terminal of rectifier 14 is connected to the middle terminal of the motor 10 which, as shown, is also connected to the lower supply line 11 when switching device 13 is closed.

Similarly, one alternating-current terminal of rectifier 15 is arranged to be connected to the lower phase of the supply source 11 when switching device 17 is closed, and the other alternating-current terminal of the rectifier is connected to the right-hand terminal of the motor 10 which is also connected to the lower phase of the supply source 11 when switching device 12 is closed.

The operation is as follows: If it is desired to cause the motor to rotate in the forward direction, switching device 16 is closed to connect the rectifier 14 across the bottom and top phases 11a and 11b of the supply source through two phases of the stator winding of the motor 10. As a result, direct current is supplied to the operating coil of switching device 12, and this device closes its contacts to connect the motor 10 to the source 11 for rotation in the forward direction.

If it is desired to reverse the direction of rotation of motor 10, switching device 16 is opened and switching device 17 is closed. Opening of switching device 16 disconnects rectifier 14 from the source 11 and thereby deenergizes the operating coil of switching device 12 which opens its contacts in response to deenergization of the operating coil. Closing switching device 17 connects rectifier 15 to the source 11 through two phases of the stator winding of motor 10 and as a result, direct current is supplied to the operating coil of switching device 13. If the contacts of switching device 13 should close while an arc is hanging on the contacts of switching device 12, one or more phases of the supply source 11 would be short-circuited.

Assuming that an arc is hanging on the contact 12b of switching device 12, both alternating-current terminals of rectifier 15 would be connected to the phase 11a of the supply source over the following circuit: From the lower phase 11a of the supply source through switching device 17, rectifier 15, conductors 18 and 19, contact 12b (through the arc that is hanging on these contacts) and thence by conductor 20 to phase 11a of the supply source. As a result of this connection, no current will flow through rectifier 15, and operating coil 13 will remain unenergized until the arc is extinguished at contact 12b. When this arc is extinguished, the lower alternating-current terminal of rectifier 15 will be connected through conductors 18 and 19 through two phases of motor 10 and conductor 21 to upper phase 11b of the supply source. Direct current will then be supplied to the operating coil of contactor 13 which will close in response to energization to connect motor 10 to the supply source 11 for rotation in the reverse direction.

It will be noted that if it is subsequently desired to reconnect the motor 10 to the source 11 for rotation in the forward direction, both alternating-current terminals of rectifier 14 will be connected to the lower phase 11a of the supply source as long as any arc persists on contact 13b of switching device 13.

Thus, the operating coils of both switching devices 12 and 13 are supplied with direct current through full-wave rectifiers 14 and 15, and the rectifier circuits are so interlocked with the switching devices that neither switching device can be closed as long as an arc persists upon the contacts of the other.

In the modification of Fig. 2, the rectifiers 22 and 23, which supply direct current to the operating coils of switching devices 24 and 25 respectively, are connected by means of relays 26 and 27 directly to the source 29. The operating coils of relays 26 and 27 are connected by means of push button switches 30 and 30a respectively to the terminals of the secondary winding of a transformer 28, the primary winding of which is connected across the lower and middle phases 29a, 29b of a polyphase source 29.

Thus the rectifier circuits for the switching devices 24 and 25 are indirectly controlled by the control switching devices 30 and 30a, which is often desirable or necessary in complex control systems or in control systems in which relatively large control currents are required for operation of the control devices. An advantage of the arrangement disclosed in Fig. 2 is that low voltage is utilized in the relay control circuits.

As in the system of Fig. 1, if an arc persists on the contact 24a, the operating coil of contactor 25 for the reverse direction of rotation cannot be energized as long as this arc persists and conversely, if an arc is hanging on contact 25a of the reverse contactor 25, the operating coil of contactor 24 cannot be energized as long as this arc persists. The operation is substantially identical with that described in connection with the system of Fig. 1.

In the systems of Figs. 1 and 2, protection is provided against only one phase of the connections established by the switching devices 12, 13. For example, in Fig. 1 projection is provided only against hanging arcs on contact 12b of switching device 12 and contact 13b of switching device 13. If the arc at contact 12b should be extinguished before the arc at contact 12c, it is possible to close the contactor 13 and thereby to short-circuit the phase 11a, 11b of the supply source. Under ordinary operating conditions, protection of one phase of the reversing switching devices is sufficient, but occasionally, under extreme operating conditions an arc may be extinguished at one contact of a switching device before it is extinguished at the other contact, and in such a case if the reverse switching device should be closed, a phase short circuit would result.

For such extreme operating conditions, the slightly more complex control system disclosed in Fig. 3 may be utilized. This system provides protection against an arc persisting at either contact of the main contactors after the arc at the other contact has been extinguished.

In this modification, the alternating-current motor 31 is arranged to be connected to the supply source 32 by means of electromagnetic contactors 33, 34. The operating coils of contactors 33, 34 are supplied with direct current by means of full-wave rectifiers 35, 36, respectively which, in turn, are arranged to be connected to the supply source 32 by means of relays 37, 38 respectively.

The operating coils of relays 37, 38 are, in turn, supplied with direct current from full-wave rectifiers 39, 40 respectively which, in turn, are arranged to be connected to the lower phase 32a of the supply source by control switching devices 41, 42.

The upper alternating-current terminal of rectifier 39 is arranged to be connected to the lower phase 32a of the supply source, and the lower alternating-current terminal of this rectifier is connected to the middle terminal of the motor 31, which is also connected to the lower phase 32a of the supply source when the switching device 34 is closed, or when an arc persists on contact 34a.

Similarly, the upper alternating-current terminal of rectifier 35 is connected to the middle phase 32b of the supply source when relay 37 is closed, and the lower alternating-current terminal of rectifier 35 is connected to the right-hand terminal of motor 31, which is also connected to the middle pase 32b of the supply source through conductor 43 when switching device 34 is closed, or when an arc persists at contact 34b. Thus, as long as an arc persists at either contact 34a or 34b, the operating coil of contactor 33 cannot be energized. If an arc persists on contact 34a only, rectifier 39 will be short-circuited and operating coil of relay 37 will be deenergized with the result that relay 37 will remain open so that no current can be supplied to the rectifier 35 which supplies the direct current for the operating coil of contactor 33. Similarly, if an arc persists on contact 34b only, the rectifier 35 will be short-circuited and no current will be supplied to the operating coil of contactor 33. Therefore, contactor 33 will remain open until the arcs at both contacts 34a and 34b are extinguished.

Similarly, as long as an arc persists at contact 33a of contactor 33, closing of the switching device 42 will not result in energizing relay 38 because both alternating-current terminals of rectifier 40 will be connected to the lower phase 32a of the supply source through conductors 44 and 43, contacts 33a (through the arc which is hanging on these contacts), and conductor 45 to the phase 32a. As long as the arc persists at contact 33a, relay 38 will remain open and no current will be supplied to rectifier 36 with the result that the operating coil of contactor 34 remains unenergized, and contactor 34 cannot close until the arc at contact 33a is extinguished.

Similarly, as long as an arc persists at contact 33b, bolt alternating-current terminals of rectifier 36 are connected to the middle phase 32b of the supply source through conductors 46 and 47, and contacts 33b (through the arc which is hanging on these contacts), and conductor 48 to the middle phase 32b.

Thus as long as an arc persists on either contact of the main contactors, 33, 34, the operating coil of the other contactor cannot be energized and the other contactor cannot be closed.

What I claim as new and desire to secure by Letters Patent of the United States is:

1. A control system for an alternating-current motor supplied from a polyphase source comprising a pair of electroresponsive devices each having an operating coil for effecting the connection of said motor to said source for rotation in either direction, and a pair of rectifiers, one for each of said devices for supplying direct current to said operating coils, each of said rectifiers having an alternating-current terminal connected to one phase of said source and another alternating-current terminal connected to the terminal of the motor having the same voltage when the electroresponsive device associated with the other of said devices is actuated.

2. A control system for an alternating-current motor supplied from a polyphase source comprising in combination, a pair of electromagnetic contactors, each having an operating coil, for connecting said motor to said source for rotation in either direction, a full-wave rectifier for supplying direct current to the coil of one of said contactors, a second full-wave rectifier for supplying direct current to the coil of the other of said contactors, electrical connections between one alternating-current terminal of each of said rectifiers and one phase of said source, and electrical connections between the other alternating-current terminal of each of said rectifiers and the terminal of the motor having the same voltage as said phase when the contactor whose coil is supplied from the other of said rectifiers is closed.

3. A control system for an alternating-current motor supplied from a polyphase source comprising in combination, a pair of electromagnetic contactors, each having an operating coil, for connecting said motor to said source for rotation in either direction, a pair of rectifiers, one for each of said contactors, for supplying direct current to said coils, a pair of relays, one for each of said rectifiers, for connecting one alternating-current terminal of each of said rectifiers to one phase of said source, and connections between the other alternating-current terminal of each of said rectifiers and the terminal of said motor having the same voltage as said phase when the contactor whose coil is supplied from the other of said rectifiers is closed.

4. A control system for an alternating-current motor supplied from a polyphase source comprising in combination, a pair of switching devices, each having an operating coil, for connecting said motor to said source for rotation in either direction, a pair of rectifiers, one for each of said switching devices, for supplying direct current to its operating coil, a pair of relays, one for each of said rectifiers, for connecting one alternating-current terminal of each of said rectifiers to one phase of said source, connections between the other alternating-current terminal of each of said rectifiers and the motor terminal having the same voltage as said phase when the switching device whose operating coil is supplied from the other of said rectifiers is closed, a second pair of rectifiers, one for each of said relays, for supplying direct current to its operating coil, means for connecting one alternating-current terminal of each of said second pair of rectifiers to a second phase of said source and connections from the other alternating-current terminal of each of said second pair of rectifiers to the motor terminal having the same voltage as said second phase when the switching device controlled by the relay whose coil is supplied from the other of said rectifiers is closed.

WALTER BOEKER.